(12) United States Patent
Crouch-Baker

(10) Patent No.: US 9,228,267 B1
(45) Date of Patent: Jan. 5, 2016

(54) USE OF FLUIDIZED-BED ELECTRODE REACTORS FOR ALANE PRODUCTION

(71) Applicant: Steven Crouch-Baker, Palo Alto, CA (US)

(72) Inventor: Steven Crouch-Baker, Palo Alto, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 384 days.

(21) Appl. No.: 13/671,122

(22) Filed: Nov. 7, 2012

Related U.S. Application Data

(60) Provisional application No. 61/556,731, filed on Nov. 7, 2011.

(51) Int. Cl.
| | | |
|---|---|---|
| C25B 1/00 | (2006.01) | |
| C25B 15/08 | (2006.01) | |
| C25B 9/16 | (2006.01) | |
| C01B 6/06 | (2006.01) | |
| H01M 10/26 | (2006.01) | |
| H01M 8/06 | (2006.01) | |

(52) U.S. Cl.
CPC . *C25B 9/162* (2013.01); *C01B 6/06* (2013.01); *C25B 1/00* (2013.01); *C25B 15/08* (2013.01); *H01M 8/0656* (2013.01); *H01M 10/26* (2013.01)

(58) Field of Classification Search
CPC .......... C25B 9/162; C25B 1/00; C25B 15/08; H01M 8/0656
USPC .......................................... 429/422; 205/348
See application file for complete search history.

(56) References Cited

U.S. PATENT DOCUMENTS

| | | |
|---|---|---|
| 3,032,037 A | 5/1962 | Havirco et al. |
| 3,184,528 A | 5/1965 | Norwalk et al. |
| 3,801,657 A | 4/1974 | Scruggs |
| 3,801,707 A | 4/1974 | Ardis et al. |
| 3,810,974 A | 5/1974 | King |
| 3,812,244 A | 5/1974 | Schmidt et al. |
| 3,816,192 A | 6/1974 | Brower et al. |
| 3,819,335 A | 6/1974 | Daniels et al. |
| 3,819,819 A | 6/1974 | Matzek et al. |
| 3,821,044 A | 6/1974 | Roberts |

(Continued)

FOREIGN PATENT DOCUMENTS

| | | |
|---|---|---|
| GB | 833646 | 4/1960 |
| GB | 2281059 A | 2/1995 |
| WO | WO2012018640 A1 | 2/2012 |

OTHER PUBLICATIONS

Finholt, A. E. et al., "Lithium Aluminum Hydride, Aluminum Hydride and Lithium Gallium Hydride and Some of Their Applications in Organic and Inorganic Chemistry," J. Am. Chem. Soc., 69:1199-1203, May 1947.

(Continued)

*Primary Examiner* — Kenneth Douyette
*Assistant Examiner* — James Lee
(74) *Attorney, Agent, or Firm* — Carr & Ferrell LLP

(57) ABSTRACT

Fluidized-bed reactors for producing alane are provided herein. An exemplary process includes inducing a negative electrical potential in an electrolyte solution to produce an anolyte solution that includes an alane adduct, wherein the negative electrical potential is generated between anode aluminum particles and cathode aluminum particles, the electrolyte solution including sodium aluminum hydride dissolved in a solvent, the anode aluminum particles and cathode aluminum particles being separated by a diaphragm.

8 Claims, 1 Drawing Sheet

(56) References Cited

U.S. PATENT DOCUMENTS

| | | |
|---|---|---|
| 3,823,226 A | 7/1974 | Brower et al. |
| 3,826,820 A | 7/1974 | Roberts et al. |
| 3,838,194 A | 9/1974 | Reigler et al. |
| 3,838,195 A | 9/1974 | Reigler et al. |
| 3,840,654 A | 10/1974 | Schmidt et al. |
| 3,843,774 A | 10/1974 | York et al. |
| 3,850,709 A | 11/1974 | Schmidt |
| 3,857,930 A | 12/1974 | Kraus et al. |
| 3,869,544 A | 3/1975 | Niles et al. |
| 3,869,545 A | 3/1975 | Terada et al. |
| 3,883,644 A | 5/1975 | Matzek et al. |
| 4,006,095 A | 2/1977 | Hoffman et al. |
| 4,048,087 A | 9/1977 | Daniels et al. |
| 4,370,294 A | 1/1983 | Franken et al. |
| 4,395,219 A | 7/1983 | Franken et al. |
| 4,747,701 A | 5/1988 | Perkins |
| 5,292,387 A | 3/1994 | Highsmith et al. |
| 5,670,129 A | 9/1997 | Klapdor et al. |
| 5,730,952 A | 3/1998 | Rathman et al. |
| 6,228,338 B1 | 5/2001 | Petrie et al. |
| 6,617,064 B2 | 9/2003 | Petrie et al. |
| 2001/0038821 A1 | 11/2001 | Petrie et al. |
| 2007/0056970 A1 | 3/2007 | Scherer et al. |
| 2008/0216906 A1 | 9/2008 | Curello et al. |
| 2009/0038954 A1* | 2/2009 | Zidan .................. 205/477 |
| 2010/0252444 A1* | 10/2010 | Vajo et al. ............. 205/477 |
| 2012/0017439 A1 | 1/2012 | Yamamoto et al. |

OTHER PUBLICATIONS

Rice Jr., M. J. et al., Contract ONR-494(04) ASTIA No. 106967, U.S. Office of Naval Research. 1956.

Tskhai, A. N. et al., "The Kinetics and a Mathematical Model of the Isothermal Crystallisation of Aluminum Hydride from Ether-Toluene Solutions," Russian Journal of Inorganic Chemistry, 37(8):877-885. 1992.

Brower, F. M. et al., "Preparation and Properties of Aluminum Hydride," Journal of the American Chemical Society, 98(9):2450-2453. Apr. 28, 1976.

Bulychev, B. M. et al. (1998), "Complex Compounds of Aluminum Hydride Ethoxide with Mixed Aluminum and Boron Hydrides of Lithium and Magnesium: Compositions, Physicochemical Properties, and Synthesis of Unsolvated Aluminum Hydride," Russian Journal of Inorganic Chemistry, 43(5):752-758 and 43:829.

Zakharov, V. V. et al. (1992), "The Thermal Transformations of Ether Addition Compounds of Aluminum Hydride," Russian Journal of Inorganic Chemistry, 37(9):997-1005.

International Search Report and Written Opinion mailed Jan. 17, 2012 in Patent Cooperation Treaty Application No. PCT/US2011/045407, filed Jul. 26, 2011.

* cited by examiner

USE OF FLUIDIZED-BED ELECTRODE REACTORS FOR ALANE PRODUCTION

CROSS REFERENCE TO RELATED APPLICATIONS

This non-provisional U.S. patent application claims priority benefit of provisional U.S. patent application Ser. No. 61/556,731, filed on Nov. 7, 2011, which is hereby incorporated by reference herein in its entirety. This application is also related to U.S. provisional patent application Ser. No. 61/556,722 filed on Nov. 7, 2011, U.S. Pat. No. 6,228,338 issued to Petrie et al., and U.S. Pat. No. 6,617,064 issued to Petrie et al. All of the above are hereby incorporated by reference.

FIELD OF THE INVENTION

The present technology may be generally described as system and methods for producing aluminum hydride using fluidized-bed electrode reactors.

BACKGROUND

Fluidized bed electrode reactors commonly utilize solid electrodes (e.g., anode and cathode) to facilitate decomposition of an electrolyte to produce various products. These fluidized bed reactors may include dry or liquid systems that fluidize a particulate electrolyte in either a liquid or dry form. An electrical potential is applied across the electrodes to decompose the electrolyte into one or more products.

SUMMARY OF THE PRESENT TECHNOLOGY

According to some embodiments, the present technology may be directed to a reactor that includes: (a) an aluminum anode, (b) a cathode, and (c) an electrolyte that comprises sodium aluminum hydride dissolved in a solvent; and an electrical field generator for inducing a negative electric potential between the aluminum anode and the cathode to convert at least a portion of the electrolyte into an alane adduct.

According to some embodiments, the present technology may be directed to a method that includes inducing a negative electrical potential in an electrolyte solution to produce an anolyte solution that includes an alane adduct, wherein the negative electrical potential is generated between anode aluminum particles and cathode particles, the electrolyte solution comprising sodium aluminum hydride dissolved in a solvent, the anode aluminum particles and cathode particles being separated by a diaphragm.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figures 1A, 1B:
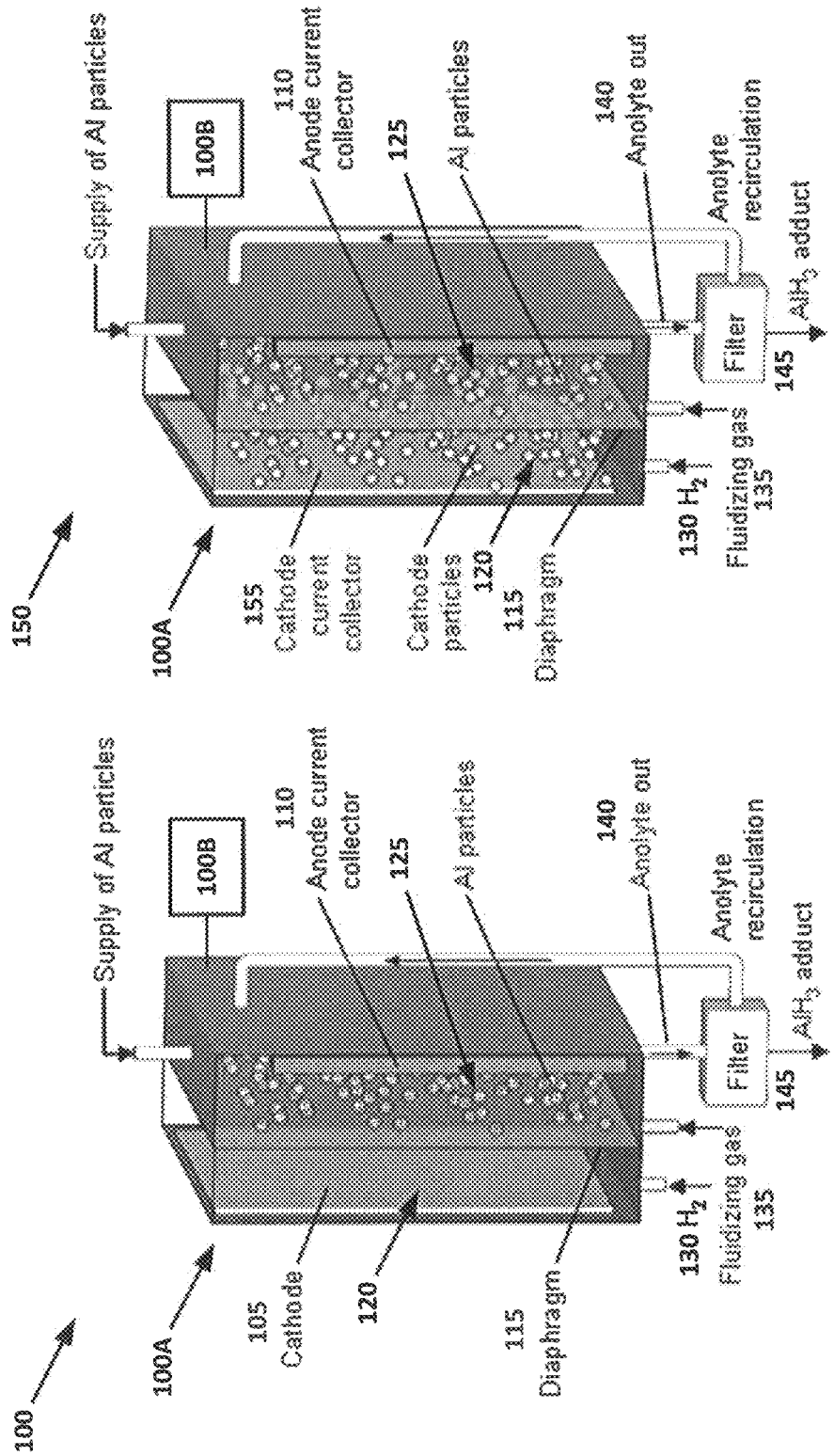
FIG. 1A is an exemplary fluidized bed reactor that uses electrochemical processes to produce alane.
FIG. 1B is another exemplary fluidized bed reactor that uses electrochemical processes to produce alane.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology describes methods and systems for production of alane via electrochemical processes. These electrochemical processes utilize aluminum anodes and cathodes to efficiently produce alane without the use of copious amounts of expensive solvents. More specifically, but not by way of limitation, the present technology may produce alane which can be converted into α-alane, which is a highly desirable alane polymorph that may be used in a variety of different industrial applications. This electrochemical process may allow for the production of alane without having to use the expensive feed stocks from the chemical process of producing alane.

Electrochemical cells (e.g., a reactor) of the present technology provide for in situ regeneration of $NaAlH_4$. The electrochemical cell includes both an aluminum anode and an aluminum negative electrode (cathode). The following electrochemical equation is illustrative of the regeneration of $NaAlH_4$ using the present technology:

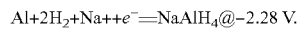

$Al+2H_2+Na++e^-=NaAlH_4 @ -2.28\ V.$

This process, combined with a first anode process, gives $Al+3/2H_2=AlH_3$ (alane) as the overall cell reaction, with no (or relatively low) net consumption of $NaAlH_4$. Exemplary anode processes are described in greater detail below. Reducing consumption of $NaAlH_4$ is advantageous due to reductions in material cost. In some instances, supplemental hydrogen may be provided at the cathode and at least a portion of the cathode and anode may be consumed. Thus, periodic replacement of the aluminum anode and/or aluminum cathode may be required, although the cost associated with aluminum is minor compared to the use of platinum-based cathodes. Advantageously, the replacement of a platinum cathode with an aluminum cathode not only reduces material costs, but also provides unique and unexpected benefits, namely regeneration of $NaAlH_4$.

Referring now to the drawings and in particular to FIG. 1A, which illustrates an exemplary fluidized bed reactor, hereinafter "reactor 100" is shown. The reactor 100 is shown as generally comprising a housing 100A, an aluminum cathode 105, an aluminum anode current collector 110, and a diaphragm 115 that separates the reactor 100 into a cathode chamber 120 and an anode chamber 125. The reactor 100 may also comprise an electrical field generator 100B that produces a negative electric potential in the reactor 100.

According to some embodiments, the cathode 105 may comprise a sheet, mesh, rod, grate, grid, or slab of an anode material, such as aluminum. The cathode 105 may also be in the form of particles, including aluminum particles. The reactor 100 may also comprise a hydrogen inlet 130 used to introduce hydrogen gas into the cathode chamber 120. A fluidizing gas inlet 135 is also provided for introduction of fluidizing gas within the reactor 100.

An electrolyte comprised of NaAlH$_4$, which has been dissolved into a tertiary amine and/or a donor solvent molecule such as tetrahydrofuran is placed into the reactor 100. When the negative electric potential is applied, an alane adduct produced by the decomposition of the NaAlH$_4$ may form on the surface of the aluminum particles, and on surface of the anode current collector 110. The solvent or amine may remove the alane from the aluminum particles and anode current collector 110 to create an anolyte mixture which includes an alane adduct. Anolyte may be removed from the reactor 100 via an anolyte outlet 140.

As the electrolyte solution is decomposed in the reactor 100 by application of the negative electrical potential across the cathode 105 and the aluminum anode current collector 110, free sodium, aluminum, and hydrogen molecules may form sodium aluminum hydride in the cathode chamber 120. When the reaction that decomposes the electrolyte in the anode chamber 125 is less than 100% efficient, the amount of free hydrogen gas may be insufficient to allow the regeneration of NaAlH$_4$ in the cathode chamber 120. Thus, hydrogen gas may be introduced into the electrolyte through the hydrogen inlet 130, increasing the regeneration of NaAlH$_4$.

According to some embodiments, the reactor 100 may comprise a filter 145 which receives and filters the anolyte to remove alane adduct produced by the reactor 100 from solvents or other anolyte materials. Once the alane adduct has been filtered, the filter 145 may recirculate the filtered anolyte back into the reactor 100. Additionally, spent aluminum particles may be filtered from the anolyte solution and returned to the reactor 100.

FIG. 1B illustrates another exemplary reactor 150, which is constructed similarly to the reactor 100 of FIG. 1A, with the exception that the cathode 105 (e.g., the solid cathode collector) has been replaced with a cathode current collector 155. Cathodic particles, such as conductive aluminum particles are dispersed throughout the cathode chamber 120 and are maintained in a state of agitation using a flowing electrolyte and/or a fluidizing gas. Electrical contact with the conductive cathode particles in the cathode chamber 120 may be maintained via the cathode current collector 155.

Advantageously, both reactors 100 and 150 utilize particulate electrodes, such as anode particles, cathode particles, or both. It is noteworthy that significant increase in reactive surface area is seen between solid electrodes and particulate electrodes. This increase in reactive surface area may overcome the inherent or intrinsically low reactive nature of solid aluminum electrodes, or any other electrode material for that matter. Stated otherwise, using particulate electrodes significantly improves reactivity of the electrode compared to the same material in solid form. Additionally, the increased surface area reduces the amount of overvoltage needed for the electrochemical reaction to occur.

When aluminum particles are used in the reactors, spent aluminum particles may be filtered from an anloyte solution created and recirculated into the reactor, creating, in some instances, a closed loop system, depending on the efficiency of the anode reactions occurring within the reactor. Since the spent aluminum is already in the form of a particle, which has a high surface area for reactions to occur, the spent aluminum particles may be re-used directly, without having to create an aluminum sheet or mesh cathode. This significantly reduces post-use process time and cost of the aluminum particles.

Regardless of the reactor configuration the following anode and cathode reactions may be used to produce alane adducts using a negative electrical potential. With regard to anode reactions, there are two alternate anode reaction processes that may occur within the anode chamber:

$$3NaAlH_4 + Al = 4AlH_3 + 3Na^+ + 3e^- @ -1.57 \text{ V vs. SHE;} \quad (1)$$

or $$NaAlH_4 = AlH_3 + \tfrac{1}{2}H_2 + Na^+ + e^- @ -1.73 \text{ V} \quad (2)$$

Both of these reactions occur over a similar electrical potential range and both of which proceed with the consumption of an electrolyte such as NaAlH$_4$. It is noteworthy that SHE refers to standard hydrogen electrode.

In the event that reaction (2) is produced, a putative cathode reaction may be facilitated within the cathode chamber $$Al + 2H_2 + Na^+ + e^- = NaAlH_4 \quad (3)$$

This allows for aluminum cathode particles to react with excess hydrogen and sodium in the presence of the negative electrical potential to produce NaAlH$_4$, which is the electrolyte used in the alternate anode reaction processes (1) and (2). Advantageously, in the highly efficient reaction (1), the electrolyte that is consumed at the anode is essentially replaced at the cathode resulting in no (or reduced) net consumption of materials other than aluminum and hydrogen, which are relatively inexpensive. Alternatively, to prevent loss of electrolyte reaction (2) may be supplemented by reaction (3) to facilitate regeneration of NaAlH$_4$.

Again, a solvent such as a tertiary amine or a donor solvent molecule such as tetrahydrofuran captures alane produced on the surface of the aluminum anode particles and current collector 110. The soluble alane product produced by the reactors may be removed on a continuous or semi-continuous basis via closed-loop cycling of the liquid anolyte. The anolyte may consist of a solution of alane adduct dispersed throughout 2-methyltetrahydrofuran or trialkylamine, among others. The alane adduct may be converted into α-alane by removal of the excess solvent and thermal treatment of the solvent/alane adduct or a preformed trialkylamine alane adduct.

Exemplary methods for converting soluble alane derivatives into α-alane and other alane polymorphs are described in greater detail in U.S. Pat. No. 6,228,338, issued to Petrie et al. and U.S. Pat. No. 6,617,064, also issued to Petrie et al., all of which are hereby incorporated by reference herein including all references cited therein.

According to some embodiments, the aluminum of the cathode may be replaced with an alloy, which may include various combinations of aluminum and copper, nickel, and other suitable metals that would be known to one of ordinary skill in the art with the present disclosure before them.

Additionally, it will be understood that because the electric potential range used in the exemplary anode reaction processes (1) and (2) are negative, the reactors operate under reduced conditions. Because aluminum is prone to oxidation and passivation when exposed to positive voltages, the negative potential used in the reactors reduces the passivation of the cathode, keeping the cathode substantially free from surface contamination, which reduces the reactivity of the aluminum. Furthermore, the voltage in the reactor may aid in the creation of a state similar to high pressure hydrogen in the fluidized bed reactor without actually needing to use high pressure hydrogen.

Additionally, using reduced conditions within the reactor in combination with an aluminum cathode and an aluminum anode produces unexpected results, including, but not limited to, the regeneration of the electrolyte material (NaAlH$_4$) used in the anode reaction process.

Energetic Compositions

A primary use of stabilized α-alane (and various alane polymorphs described in the patents incorporated by reference above) as prepared herein is in the manufacture of explosive and propellant compositions, particularly in the manufacture of rocket propellant compositions, including solid and solution propellants, typically solid propellants. Alane is known to be useful as an energy dense fuel in propellant formulations. The use of alane produced by the methods described herein significantly increases the stability of the propellant composition, and thus provides an important advance in the field. The propellant compositions herein, in addition to alane, contain a binder material and an oxidizer. Examples of binder materials for use in propellant applications include but are not limited to polyoxetanes, polyglycidyl azide, hydroxyl-terminated polybutadiene, polybutadieneacrylonitrileacrylic acid terpolymer, polyethers, polyglycidyl nitrate, and polycaprolactone; see, e.g., U.S. Pat. No. 5,292,387 to Highsmith et al.

Examples of oxidizers that may be incorporated into the compositions include, but are not limited to, ammonium nitrate (AN), phase-stabilized ammonium nitrate (PSAN), ammonium dinitramide (ADN), potassium nitrate (KN), potassium dinitramide (KDN), sodium peroxide ($Na_2O_2$), ammonium perchlorate (AP), KDN-AN, a cocrystallized form of potassium dinitramide and ammonium nitrate, cyclo-1,3,5-tri-methylene-2,4,6-trinitramine (RDX or cyclonite), high melting explosives (HMX), diaminodinitro ethylene (DADNE), 2,4,6,8,10,12-hexanitro-2,4,6,8,10,12-hexaazaisowurtzitane (CL-20, also known as HNIW), and combinations thereof.

The propellant may also contain an additional fuel material, typically a metallic fuel comprised of, for example, aluminum, beryllium, boron, magnesium, zirconium, or mixtures or alloys thereof. Other components for incorporation into propellant compositions include plasticizers, burn rate modifiers, ballistic additives, and the like.

In general, propellant compositions of the invention are prepared by blending the alane with the oxidizer, the binder, and a curing agent effective to cure the admixture, e.g., hexane 1,6-diisocyanate, toluene diisocyanate, isophorone diioscyanate, or the like. Proportions of fuel and oxidizer can be varied to optimize performance, as will be appreciated by those skilled in the art.

Other Uses

The present compounds may also be used as reducing agents, as polymerization catalysts, and as a hydrogen source in fuel cells and batteries.

Use as reducing agent: Alane and alane polymorphs as synthesized herein may be used as a chemical reducing agent in any context wherein a hydride donor is appropriate to bring about reduction, e.g., in reducing unsaturated carbon-carbon bonds such as present in alkenes and alkynes, in reducing carbonyl-containing moieties such as ketones, aldehydes, carboxylic acids, esters, amides, acid chlorides, in converting halides to hydrido moieties, and the like. Typically, a compound to be reduced is dissolved in an organic solvent and reacted with the stabilized a-alane of the invention and the reaction product then isolated and purified.

Use in Polymerization: Alane and alane polymorphs prepared using the methods described herein may also be used as polymerization catalysts, typically in catalyzing addition polymerization reactions (e.g., the polymerization of olefins). Generally, polymerization using the novel alane polymorphs as catalysts involves conventional processes wherein selected monomers are contacted with the alane polymorph under reaction conditions effective to provide the desired polymer composition. Polymerization may be carried out in solution, in a slurry, or in the gas phase. The monomer or comonomers used are preferably although not necessarily addition polymerizable monomers containing one or more degrees of unsaturation. Such monomers include olefinic and vinyl monomers such as ethylene, propylene, butadiene, styrene, and the like. The polymeric product resulting from the aforementioned reaction may be recovered by filtration or other suitable techniques. If desired, additives and adjuvants may be incorporated into the polymer composition prior to, during, or following polymerization; such compounds include, for example, additional catalysts (which may or may not be polymerization catalysts), pigments, antioxidants, lubricants and plasticizers.

Use as a hydrogen source in batteries and fuel cells: Additionally, alane and alane polymorphs prepared herein can be used as a hydrogen source in batteries and fuel cells. Alane provides a higher density of hydrogen than liquid hydrogen. Upon thermal or photochemical initiation, alane is theorized to initially produce an alane cation radical and a free electron. Both the cation radical and the electron can separately react with another alane molecule to initiate decomposition that results in the formation of hydrogen gas and aluminum metal. Thus, light, heat, or mobile electrons can be used as initiators to catalyze the decomposition. Accordingly, a composition containing the stabilized α-alane of the invention can be used for controlled release of hydrogen gas in a battery or fuel cell. In general, the alane products of the invention will find utility in hydrogen storage electrodes, particularly negative electrodes, in alkaline storage batteries that comprise a positive electrode, a negative electrode, and an aqueous alkaline electrolyte. In fuel cells, electrochemical devices for continuous delivery of electricity wherein the devices contain a fuel (e.g., a hydrogen source, and an oxidant), the alane products of the invention will find utility as the hydrogen source.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising: inducing a negative electrical potential in an electrolyte solution to produce an anolyte solution that includes an alane adduct, wherein the negative electrical potential is generated between anode aluminum particles and cathode aluminum particles, the electrolyte solution comprising sodium aluminum hydride dissolved in a solvent, the anode aluminum particles and cathode particles being separated by a diaphragm.

2. The method according to claim 1, further comprising filtering the anolyte solution to remove the alane adduct.

3. The method according to claim 1, further comprising recycling the solvent filtered from the anolyte solution.

4. The method according to claim 1, further comprising:
recovering aluminum particles from the anolyte solution; and
replacing at least one of the anode aluminum particles and the cathode particles with the recovered aluminum particles.

5. The method according to claim 1, further comprising:
allowing the anode aluminum particles and the cathode particles to settle; and
fluidizing the settled anode aluminum particles and cathode aluminum particles.

6. The method according to claim 1, further comprising:
fluidizing the anode aluminum particles; and
fluidizing the cathode particles.

7. A method for reducing a functional group in a molecule, the method comprising:
reacting the molecule with a reducing agent comprising a hydride donor formed by inducing a negative electrical potential in an electrolyte solution to produce an anolyte solution that includes an alane adduct, the negative electrical potential being generated between anode aluminum particles and cathode aluminum particles, the electrolyte solution comprising sodium aluminum hydride dissolved in a solvent, the anode aluminum particles and cathode particles being separated by a diaphragm.

8. A method for conducting a reaction comprising:
polymerizing monomers using a polymerization catalyst comprising a hydride donor formed by inducing a negative electrical potential in an electrolyte solution to produce an anolyte solution that includes an alane adduct, the negative electrical potential being generated between anode aluminum particles and cathode aluminum particles, the electrolyte solution comprising sodium aluminum hydride dissolved in a solvent, the anode aluminum particles and cathode particles being separated by a diaphragm.

* * * * *